US012567330B2

(12) United States Patent
Shibata

(10) Patent No.: US 12,567,330 B2
(45) Date of Patent: Mar. 3, 2026

(54) SOUND CONTROL DEVICE, SOUND CONTROL SYSTEM, SOUND CONTROL METHOD, SOUND CONTROL PROGRAM, AND STORAGE MEDIUM

(71) Applicant: PIONEER CORPORATION, Tokyo (JP)

(72) Inventor: Koji Shibata, Saitama (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 17/909,156

(22) PCT Filed: Mar. 31, 2021

(86) PCT No.: PCT/JP2021/014044
§ 371 (c)(1),
(2) Date: Sep. 2, 2022

(87) PCT Pub. No.: WO2022/208812
PCT Pub. Date: Oct. 6, 2022

(65) Prior Publication Data

US 2024/0257644 A1 Aug. 1, 2024

(51) Int. Cl.
*G08G 1/16* (2006.01)
*G08G 1/01* (2006.01)
*G08G 1/0962* (2006.01)

(52) U.S. Cl.
CPC ............. *G08G 1/166* (2013.01); *G08G 1/162* (2013.01); *G08G 1/0112* (2013.01); (Continued)

(58) Field of Classification Search
CPC ...... G08G 1/166; G08G 1/162; G08G 1/0112; G08G 1/0129; G08G 1/0133; G08G 1/0141; G08G 1/0962
See application file for complete search history.

(56) References Cited

U.S. PATENT DOCUMENTS

2006/0287787 A1* 12/2006 Engstrom .............. G01C 21/26
701/36
2008/0235017 A1 9/2008 Satomura
(Continued)

FOREIGN PATENT DOCUMENTS

EP 2 560 151 A1 2/2013
EP 2 544 178 B1 10/2014
(Continued)

OTHER PUBLICATIONS

Japanese Patent Office as International Searching Authority; International Search Report and Written Opinion; International Application No. PCT/JP2021/014044; dated Jun. 8, 2021; 7 pages.
(Continued)

*Primary Examiner* — Jay Khandpur
(74) *Attorney, Agent, or Firm* — Foley & Lardner LLP

(57) ABSTRACT

An acquiring unit of a sound control device acquires information indicating a risk corresponding to a position of a vehicle from data in which information indicating a risk during driving originated in scenery while traveling and a position are associated with each other. An output-sound control unit performs control of a sound to be output for a driver of the vehicle according to the information acquired by the acquiring unit.

7 Claims, 8 Drawing Sheets

(52) U.S. Cl.
CPC ......... *G08G 1/0129* (2013.01); *G08G 1/0133* (2013.01); *G08G 1/0141* (2013.01); *G08G 1/0962* (2013.01)

(56) References Cited

U.S. PATENT DOCUMENTS

| | | | | |
|---|---|---|---|---|
| 2010/0201509 | A1* | 8/2010 | Hara | G08G 1/166<br>340/435 |
| 2010/0239101 | A1 | 9/2010 | Okamura et al. | |
| 2013/0058497 | A1 | 3/2013 | Okamura et al. | |
| 2016/0044402 | A1 | 2/2016 | Okamura et al. | |
| 2016/0059853 | A1* | 3/2016 | Yamakoshi | H04L 12/00<br>701/36 |
| 2018/0268225 | A1* | 9/2018 | Sakashita | H04N 23/45 |
| 2020/0391752 | A1 | 12/2020 | Hagiwara | |
| 2021/0245739 | A1* | 8/2021 | Verburg | B60W 50/08 |
| 2022/0238019 | A1* | 7/2022 | Tsuda | G08G 1/166 |

FOREIGN PATENT DOCUMENTS

| | | | |
|---|---|---|---|
| EP | 1 706 815 | B1 | 8/2015 |
| JP | 2008-233678 | A | 10/2008 |
| JP | 2010-128099 | A | 6/2010 |
| JP | 2013-009825 | A | 1/2013 |
| JP | 2014-154004 | A | 8/2014 |
| JP | 2015-065661 | A | 4/2015 |
| JP | 2016-050964 | A | 4/2016 |
| JP | 2018-063338 | A | 4/2018 |
| JP | 2019-009742 | A | 1/2019 |

OTHER PUBLICATIONS

Extended European Search Report issued in EP Application No. 21927055.0 dated Nov. 29, 2024 (10 pages).

* cited by examiner

SOUND CONTROL DEVICE, SOUND CONTROL SYSTEM, SOUND CONTROL METHOD, SOUND CONTROL PROGRAM, AND STORAGE MEDIUM

FIELD

The present invention relates to a sound control device, a sound control system, a sound control method, a sound control program, and a storage medium.

BACKGROUND

Conventionally, an in-car device that selects sound contents according to a degree of fatigue and a degree of consciousness of a driver of a vehicle, and that reproduces the selected sound contents has been known (for example, refer to Patent Literature 1).

CITATION LIST

Patent Literature

Patent Literature 1: JP-A-2019-9742

SUMMARY

Technical Problem

However, the conventional technique has a problem that a perceptual load on a driver can be excessive.

For example, it is necessary for a driver to look out of the vehicle all the time, and to listen to sounds for safety. Moreover, it is considered that the degree of attention paid by the driver at those times varies depending on road conditions.

For example, at a place with poor visibility such as a corner, it is necessary for the driver to get more information visually and aurally compared to a straight road with good visibility.

If sound contents are reproduced under such a condition that much information is necessary to be obtained, a perceptual load on the driver can be excessive.

Furthermore, as a result of an excessive perceptual load, the attention of the driver can be distracted to affect safety.

The present invention has been achieved in view of the above problems, and it is an object of the present invention to provide a sound control device, a sound control system, a sound control method, a sound control program, and a storage medium that can prevent a perceptual load on a driver from being excessive.

Solution to Problem

The sound control device includes: an acquiring unit that acquires information indicating a risk corresponding to a position of a moving object from data in which information indicating a risk during driving originated in scenery while traveling and a position are associated with each other; and an output-sound control unit that controls a sound to be output for a driver of the moving object according to the information acquired by the acquiring unit.

The sound control system includes: a first moving object; a second moving object; and a sound control device, wherein the first moving object includes a transmitting unit that transmits a first image capturing a view in a direction of a line of sight of a driver of the first moving object, and a position of the first moving object at a time of imaging the first image to the sound control device, the sound control device includes a generating unit that generates data in which information indicating a risk acquired by inputting the first image a calculation model, which is generated based on an image and information of a line of sight of a subject relating to the image, and which is to calculate information indicating a risk relating to driving from an image, and a position of the first moving object are associated with each other; an acquiring unit that acquires information indicating a risk corresponding to a position of the second moving object from the data generated by the generating unit; and an output-sound control unit that performs control of a sound to be output for a driver of the second moving object according to the information acquired by the acquiring unit, and the second moving object includes a transmitting unit that transmits a position of the second moving object to the sound control device; and an output unit that outputs a sound according to control by the output-sound control unit.

A sound control method is provided which is performed by a computer, the method comprising: an acquiring step of acquiring information indicating a risk corresponding to a position of a moving object from data in which information indicating a risk during driving originated in scenery while traveling and a position are associated with each other; and a sound control step of controlling a sound to be output for a driver of the moving object according to the information acquired by the acquiring step.

A sound control program is provided that causes a computer to execute: an acquiring step of acquiring information indicating a risk corresponding to a position of a moving object from data in which information indicating a risk during driving originated in scenery while traveling and a position are associated with each other; and a sound control step of controlling a sound to be output for a driver of the moving object according to the information acquired by the acquiring step.

A storage medium that stores a sound control program causing a computer to execute: an acquiring step of acquiring information indicating a risk corresponding to a position of a moving object from data in which information indicating a risk during driving originated in scenery while traveling and a position are associated with each other; and a sound control step of controlling a sound to be output for a driver of the moving object according to the information acquired by the acquiring step.

DESCRIPTION OF EMBODIMENTS

Figure 1:
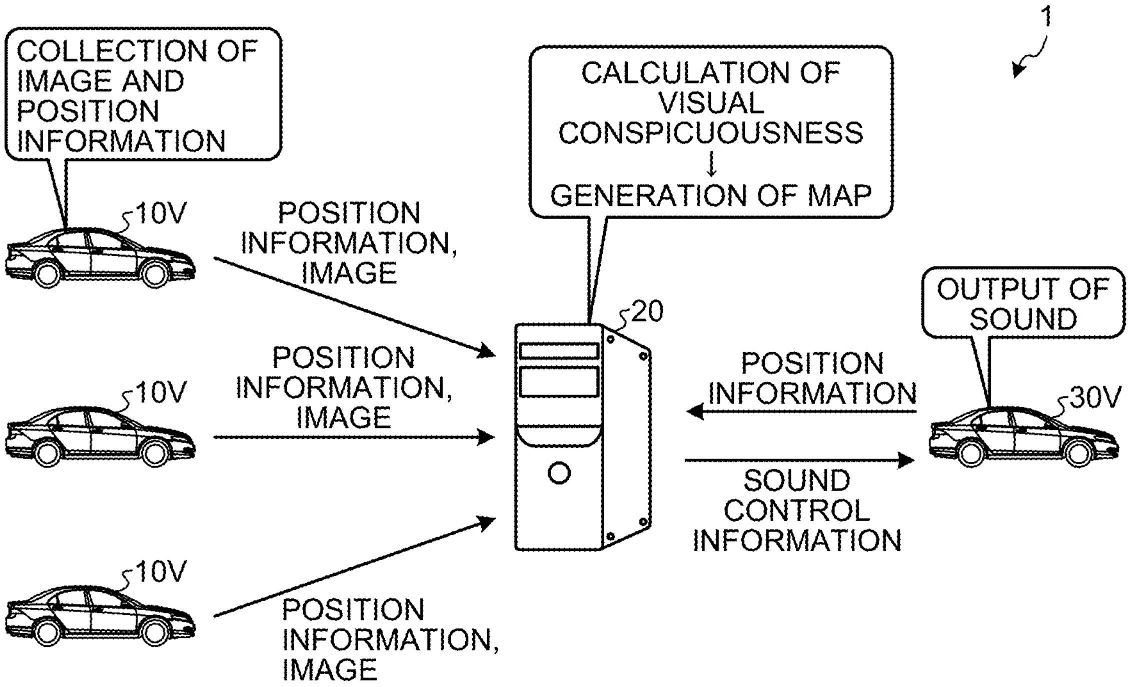
FIG. 1 is a diagram illustrating a configuration example of a sound control system according to a first embodiment.

Hereinafter, forms (hereinafter, embodiments) to implement the present invention will be explained, referring to the drawings. The embodiments explained below are not intended to limit the present invention. Furthermore, in description of the drawings, like reference signs are assigned to like parts.

First Embodiment

FIG. 1 is a diagram illustrating a configuration example of a sound control system according to a first embodiment. As illustrated in FIG. 1, a sound control system 1 includes a vehicle 10V, a sound control device 20, and a vehicle 30V. The vehicle is one example of a moving object, and is, for example, a motor vehicle. Moreover, the sound control device 20 functions as a server.

A driver of the vehicle 30V needs to look at surroundings of the vehicle 30V all the time while driving. Therefore, the driver while driving is to keep taking in visual information.

Furthermore, a speaker mounted on the vehicle 30V outputs information by sound. Therefore, depending on the volume of sound and the amount of information output from the speaker, a perceptual load on the driver of the vehicle 30V can be excessive. In such a case, the attention of the driver can be distracted, and the safety can be reduced.

Accordingly, the sound control system 1 controls sounds to be output in the vehicle 30V, to control the sounds such that a perceptual load on the driver of the vehicle 30V is not to be excessive.

As illustrated in FIG. 1, the vehicle 10V collects an image and position information. Moreover, the vehicle 10V transmits the collected image and the position information to the sound control device 20 through a communication network, such as the Internet. The number of vehicle 10V is not limited to the number illustrated in FIG. 1, and it may be at least one.

The sound control device 20 performs calculation of visual conspicuousness and generation of map information based on the image and the position information of the vehicle 10V. The visual conspicuousness and a map will be described later. The visual conspicuousness is also called as the visual saliency.

The sound control device 20 returns sound control information based on the position information notified by the vehicle 30V and the generated map, to the vehicle 30V. The vehicle 30V performs output of a sound according to the sound control information.

Figure 2:
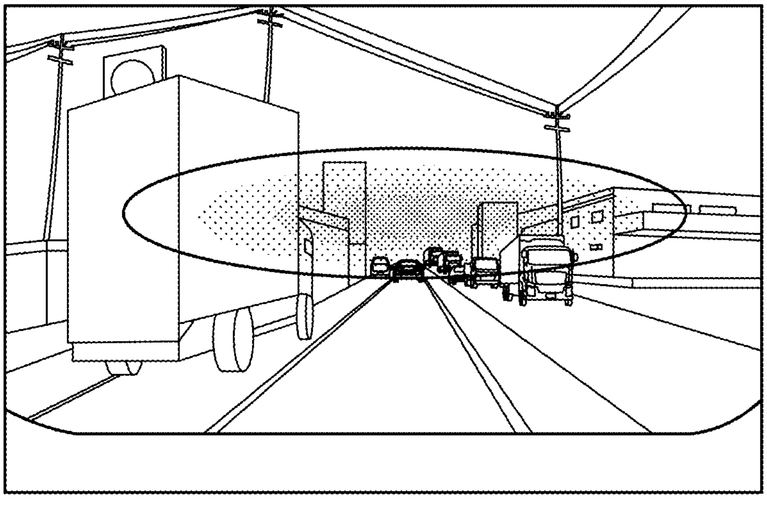
FIG. 2 is a diagram explaining visual conspicuousness.

The visual conspicuousness will be explained by using FIG. 2. FIG. 2 is a diagram explaining visual conspicuousness. As illustrated in FIG. 2, the visual conspicuousness is an index acquired by estimating a position of a line of sight of a driver for an image capturing a view ahead of the vehicle (Literature Cited: JP-A-2013-009825).

The visual conspicuousness may be calculated by inputting an image to a deep learning model. For example, the deep learning model is trained based on a large number of images taken in a wide range of field and on line-of-sight information of plural subjects that have seen them actually.

The visual conspicuousness is expressed, for example, by a value of 8 bits (0 to 255) given to each pixel of an image, and is expressed as a value that increases as a possibility of being at a position of a line of sight of a driver increases. Therefore, if the value is regarded as a brightness value, the visual conspicuousness can be superimposed on an original image as a heat map as illustrated in FIG. 2. In the following explanation, a value of the visual conspicuousness of each pixel can be referred to as a brightness value.

Moreover, a degree of concentration in visual attention of the driver can also be calculated from the visual conspicuousness. The degree of concentration in visual attention is a value that is calculated from the brightness value of each pixel of a heat map based on a position of an ideal line of sight described later, and is a value having correlation that the value decreases as the degree of concentration acquired from an original image decreases in terms of human engineering.

The ideal line of sight is a line of sight directed by a driver along a traveling direction under an ideal traffic environment that there are no obstacles nor no traffic participants, and is determined in advance.

It can be regarded that the higher the degree of concentration in visual attention is, the more attention the driver is paying to the environment outside the vehicle while driving. On the other hand, it can be regarded that the lower the degree of concentration in visual attention is, the more the attention of the driver is destructed and, therefore, the degree of risk increases. Moreover, it can be regarded that the lower the degree of concentration in visual attention is, the heavier the perceptual load is.

Figure 3:
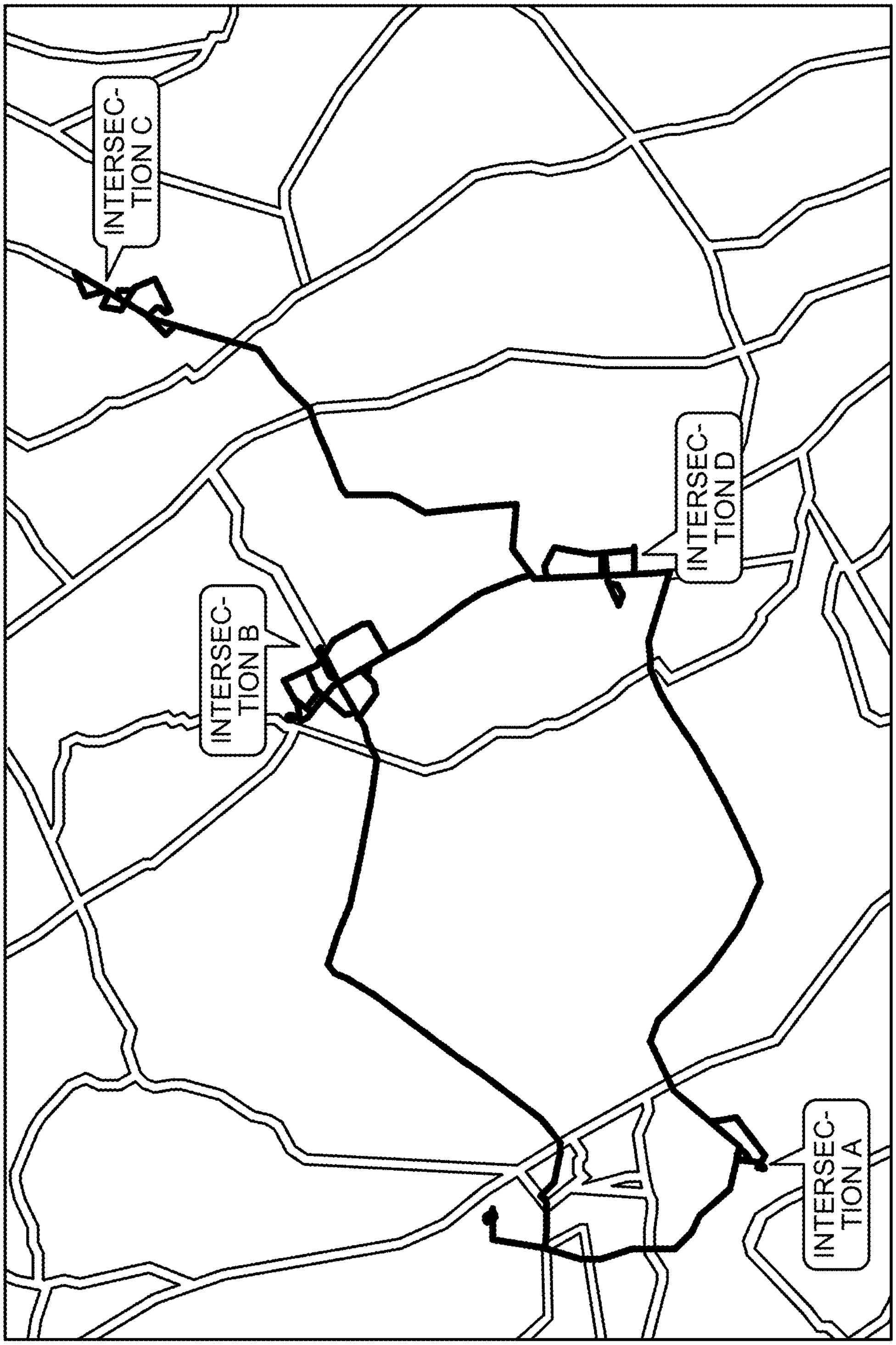
FIG. 3 is a diagram illustrating an example of a route.
Figure 4:
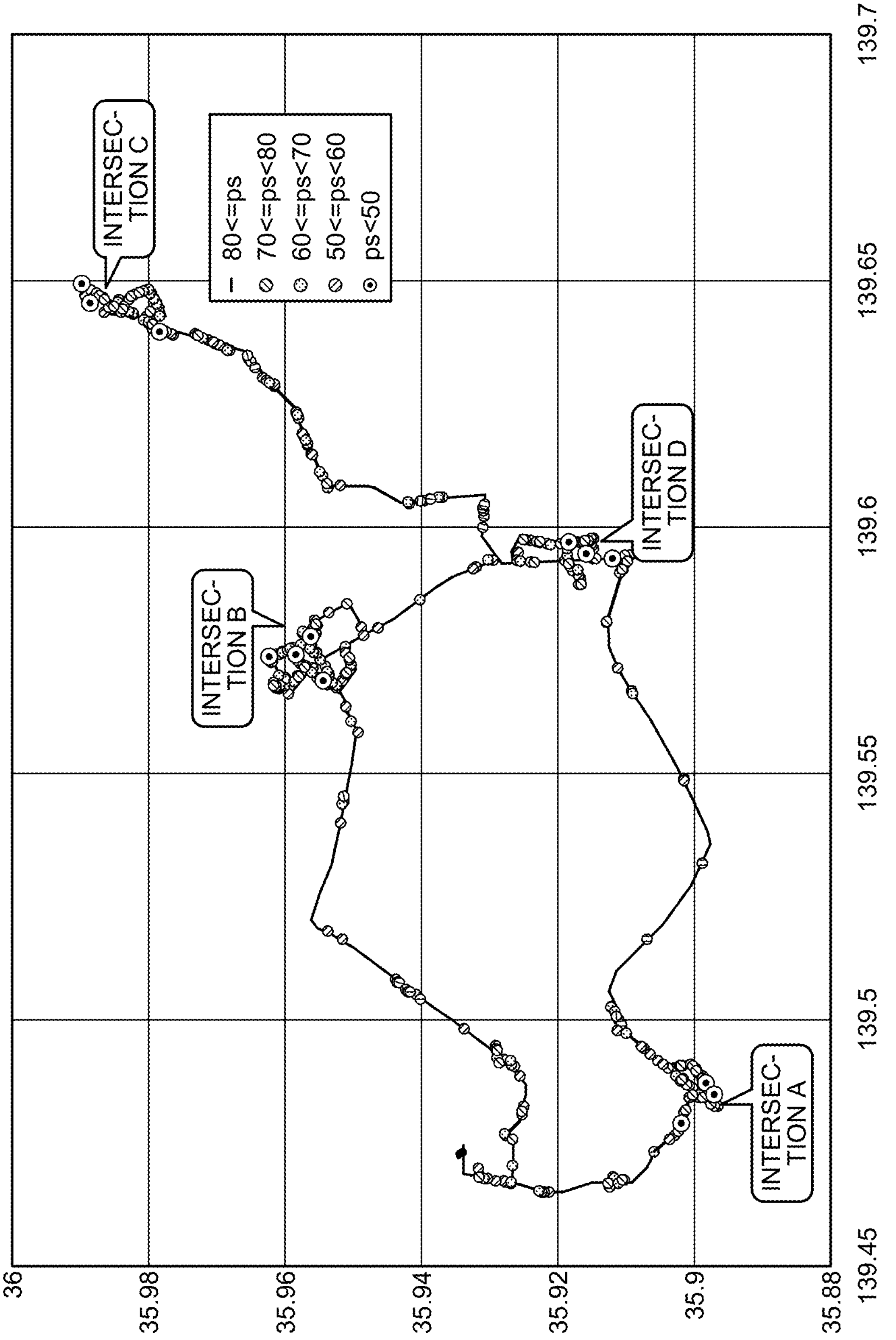
FIG. 4 is a diagram illustrating an example of a map representing a degree of concentration in visual attention.

A generation method of a map will be explained by using FIG. 3 and FIG. 4. FIG. 3 is a diagram illustrating an example of a route. FIG. 4 is a diagram illustrating an example of a map showing the degree of concentration in visual attention.

First, the vehicle 10V captures images by a camera, while traveling on a route as illustrated in FIG. 3. The camera captures an image in a direction of a line of sight of a driver of the vehicle 10V. Thus, the vehicle 10V can acquire an image close to a field of view of the driver. The camera is fixed to a position that enables imaging a forward direction of the vehicle 10V (an upper part of a windshield and the like). Therefore, a wide range including a range of a field of view of the driver looking in the traveling direction of the vehicle 10V is actually captured. In other words, the camera images a view ahead of the vehicle 10V.

The vehicle 10V transmits the captured image together with the position information to the sound control device 20. The vehicle 10V acquires position information by using a predetermined positioning function.

The sound control device 20 inputs the image transmitted by the vehicle 10V to a trained deep learning model, to perform calculation of the visual conspicuousness. Furthermore, the sound control device 20 calculates the degree of concentration in visual attention from the visual conspicuousness.

The sound control device 20 stores the degree of concentration in visual attention, associating with the position information. Moreover, the degree of concentration in visual attention associated with the position information may be expressed on a (road) map as illustrated in FIG. 4.

For example, FIG. 4 illustrates that the degree of concentration in visual attention becomes particularly low at an intersection A, an intersection B, an intersection C, and the like. The degree of concentration in visual attention becoming low means the degree of risk increasing. On the contrary, FIG. 4 illustrates that there is a tendency that the degree of concentration in visual attention becomes high on a part of straight road.

For example, the sound control device 20 controls such that a sound cannot be output at a position at which the degree of concentration in visual attention is lower than a threshold.

Moreover, contents to be output by sound include not only contents highly relevant to driving, such as a message to call attention about driving, and route navigation, but also contents less relevant to driving, such as music, news, and weather forecast.

Therefore, the sound control device 20 may perform the control by determining whether to output per sound content, or by adjusting the volume.

The vehicle 10V is assumed to have an information providing device 10 mounted thereon. Moreover, the vehicle 10V is assumed to have a sound output device 30 mounted thereon. For example, the information providing device 10 and the sound output device 30 may be an in-car device, such as a dashboard camera and a car navigation system.

The information providing device 10 functions as a transmitting unit that transmits an image capturing a view on a direction of a line of sight of a driver of the vehicle 10V, a position of the vehicle 10V at the time of capturing the image to the sound control device 20.

Figure 5:
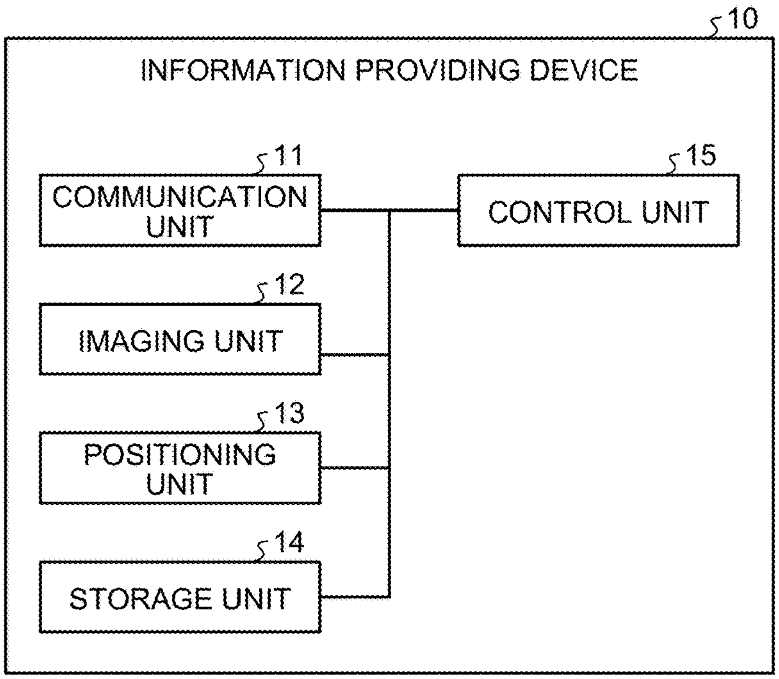
FIG. 5 is a diagram illustrating a configuration example of an information providing device.

FIG. 5 is a diagram illustrating a configuration example of the information providing device. As illustrated in FIG. 5, the information providing device 10 includes a communication unit 11, an imaging unit 12, a positioning unit 13, a storage unit 14, and a control unit 15.

The communication unit 11 is a communication module that is capable of data communication with other devices through a communication network, such as the Internet.

The imaging unit 12 is, for example, a camera. The imaging unit 12 may be a camera in a dashboard camera.

The positioning unit 13 receives a predetermined signal, and measures a position of the vehicle 10V. The positioning unit 13 receives a signal of the global navigation satellite system (GNSS) or the global positioning system (GPS).

The storage unit 14 stores various kinds of programs executed by the information providing device 10, data necessary for performing processing, and the like.

The control unit 15 is implemented by various kinds of programs stored in the storage unit 14 executed by a controller, such as a central processing unit (CPU) and a micro processing unit (MPU), and controls overall operation of the information providing device 10. The control unit 15 may be implemented by an integrated circuit, such as an application specific integrated circuit (ASIC) and a field programmable gate array (FPGA), not limited to a CPU or MPU.

Figure 6:
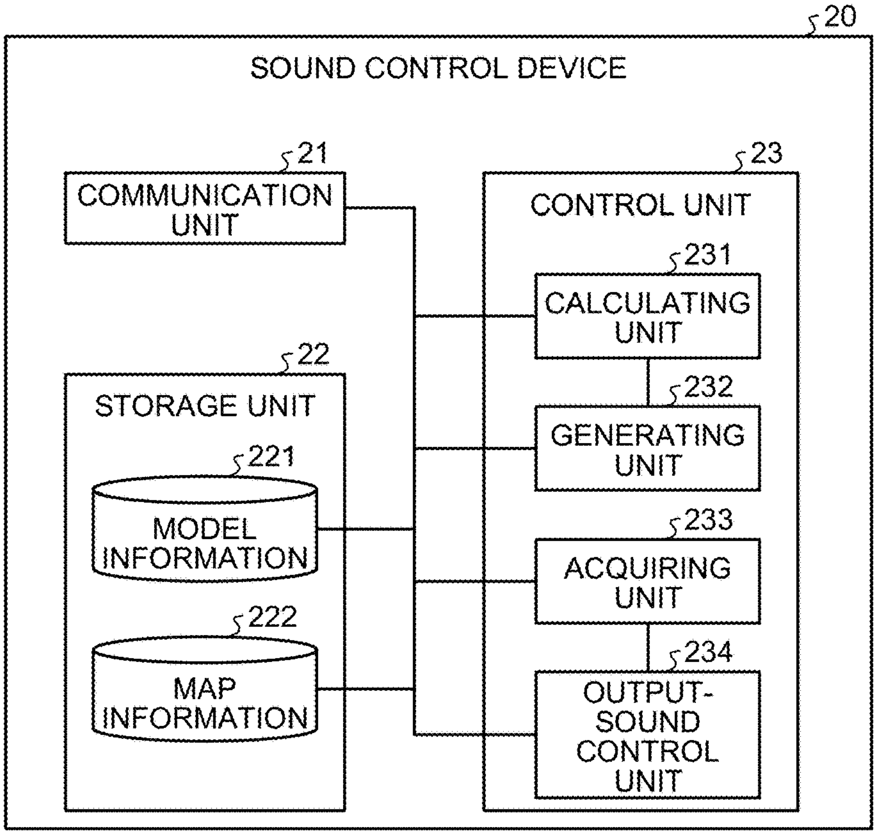
FIG. 6 is a diagram illustrating a configuration example of a sound control device.

FIG. 6 is a diagram illustrating a configuration example of the sound control device. As illustrated in FIG. 6, the sound control device 20 includes a communication unit 21, a storage unit 22, and a control unit 23.

The communication unit 21 is a communication module that is capable of data communication with other devices through a communication network such as the Internet.

The storage unit 22 stores various kinds of programs executed by the sound control device 20, data necessary for performing processing, and the like.

The storage unit 22 stores model information 221 and map information 222. The model information 221 is parameters, such as weight, to construct a deep learning model to calculate the visual conspicuousness.

Moreover, the map information 222 is data in which information indicating a risk during driving that is originated in scenery while traveling and a position are associated with each other. For example, the information indicating a risk is the degree of concentration in visual attention described previously.

The control unit 23 is implemented by executing various kinds of programs stored in the storage unit 22 by a controller such as a CPU and an MPU, and controls overall operation of the sound control device 20. The control unit 23 may be implemented by an integrated circuit, such as an ASIC and an FPGA, not limited to the CPU and the MPU.

The control unit 23 includes a calculating unit 231, a generating unit 232, an acquiring unit 233, and an output-sound control unit 234.

The calculating unit 231 inputs an image transmitted by the information providing device 10 to a deep learning model constructed from the model information, to perform calculation of the visual conspicuousness.

The deep learning model constructed from the model information 221 is a calculation model that is generated based on an image capturing a view in a direction of a line of sight of a driver of a moving object, and information about the line of sight of the driver at the time of capturing the image, and is one example of a calculation model to calculate information indicating a risk relating to driving from the image.

The generating unit 232 generates map information 222 from a result of calculation by the calculating unit 231. That is, the generating unit 232 generates data in which the information indicating a risk that is acquired by inputting the image captured by the information providing device 10 of the vehicle 10V, and a position of the vehicle 10V at the time of capturing the image are associated with each other.

The acquiring unit 233 acquires the information indicating a risk corresponding to the position of the vehicle 30V from the map information 222 in which the information indicating a risk during driving originated in scenery while traveling and a position are associated with each other.

The output-sound control unit 234 controls a sound to be output for the driver of the vehicle 30V according to the information acquired by the acquiring unit 233.

The output-sound control unit 234 controls an output of a sound content according to a degree of risk indicated by the information acquired by the acquiring unit 233 and a degree of relevance of the sound content to driving. For example, the degree of risk increases as the degree of concentration in visual attention decreases.

For example, the output-sound control unit 234 disallows output of a sound content that has been predetermined to have a low degree of relevance to driving when the degree of risk indicated by the information acquired by the acquiring unit 233 is equal to or higher than a threshold.

For example, a message to call for attention relating to driving and a route navigation are classified into contents having a high degree of relevance to driving. On the other hand, sound contents, such as music, news, and weather forecast, are classified into contents having a low degree of relevance to driving.

Moreover, the respective sound contents may be classified into levels, not just classifying into high or low in the degree of relevance to driving. In that case, for example, the output-sound control unit 234 allows to output only a message to call for attention and a route navigation that have the highest degree of relevance to driving when the degree of risk is equal to or higher than a first threshold, allows to further output weather forecast that has a medium degree of relevance to driving when the degree of risk is lower than the first threshold and equal to or higher than a second threshold, and allows to further output music that has the lowest degree of relevance to driving when the degree of risk is lower than the second threshold.

Moreover, the output-sound control unit 234 reduces a reproduction volume of a sound content as the degree of risk indicated by the information acquired by the acquiring unit 233 increases.

Furthermore, the output-sound control unit 234 controls to output by reducing contents of a sound content as the degree of risk indicated by the information acquired by the acquiring unit 233 increases. For example, the output-sound control unit 234 prepares a complete version of a sound content and a condensed version in which a part of the complete version is cut, and outputs the condensed version when the degree of risk is equal to or higher than a threshold.

The sound output device 30 functions as a transmitting unit that transmits a position of the vehicle 30V to the sound control device 20, and an output unit that outputs a sound according to a control by the sound control device 20.

Figure 7:
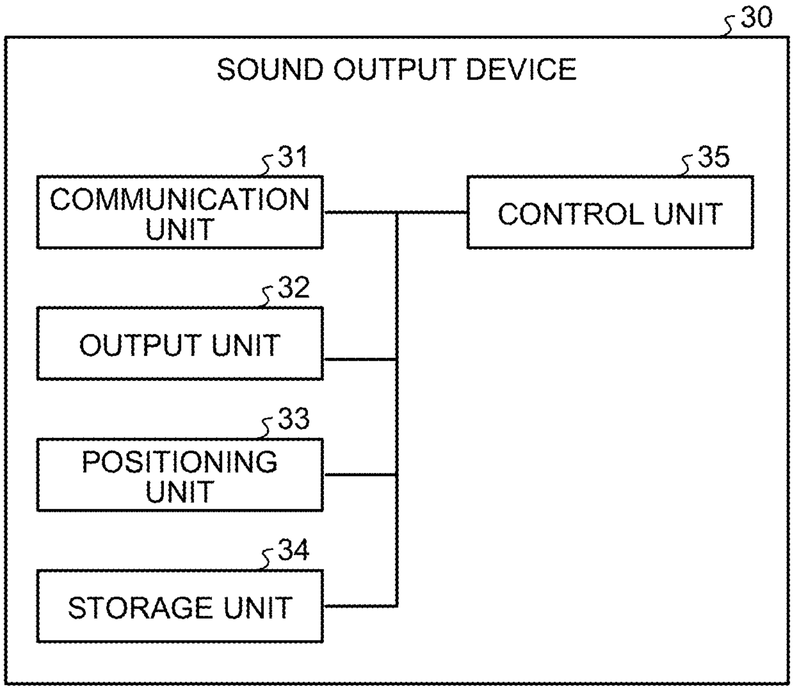
FIG. 7 is a diagram illustrating a configuration example of a sound output device.

FIG. 7 is a diagram illustrating a configuration example of the sound output device. As illustrated in FIG. 7, the sound output device 30 includes a communication unit 31, an output unit 32, a positioning unit 33, a storage unit 34, and a control unit 35.

The communication unit 31 is a communication module that is capable of data communication with other devices through a communication network, such as the Internet.

The output unit 32 is, for example, a speaker. The output unit 32 outputs a sound according to a control by the control unit 35.

The positioning unit 33 receives a predetermined signal, and measures a position of the vehicle 10V. The positioning unit 33 receives a GNSS or GPS signal.

The storage unit 34 stores various kinds of programs executed by the sound output device 30, data necessary for performing processing, and the like.

The control unit 35 is implemented by executing various kinds of programs stored in the storage unit 34 by a controller, such as a CPU and an MPU, and controls overall operation of the sound output device 30. The control unit 35 may be implemented by an integrated circuit, such as an ASIC and an FPGA, not limited to the CPU and the MPU.

The control unit 35 controls the output unit 32 based on the sound control information received from the sound control device 20.

Figure 8:
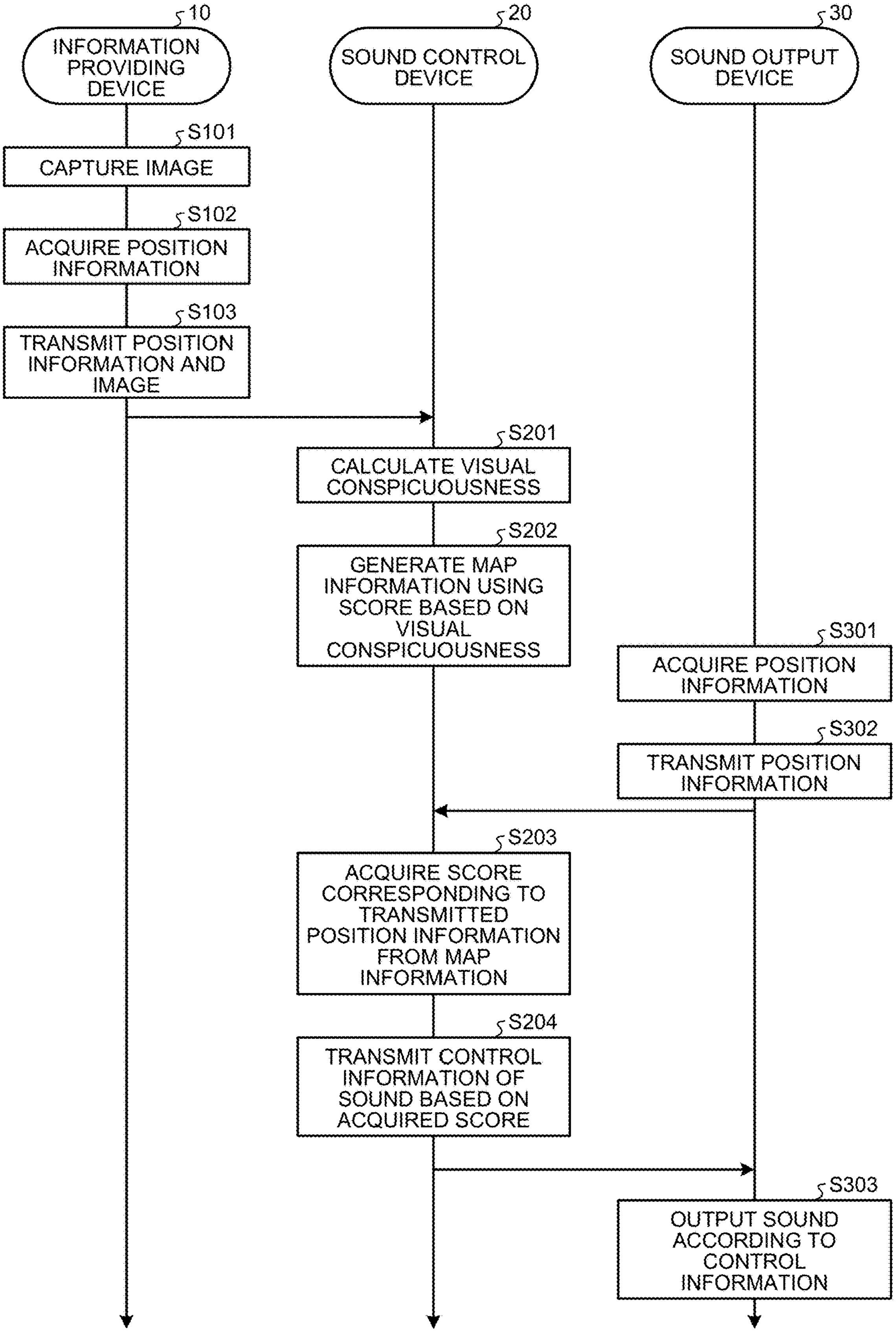
FIG. 8 is a sequence diagram illustrating a flow of processing of the sound control system according to a first embodiment.

A flow of processing of the sound control system 1 will be explained by using FIG. 8. FIG. 8 is a sequence diagram illustrating a flow of the processing of the sound control system according to the first embodiment.

As illustrated in FIG. 8, first, the information providing device 10 captures an image (step S101). Next, the information providing device 10 acquires position information (step S102). The information providing device 10 then transmits the position information and the image to the sound control device 20 (step S103).

The sound control device 20 performs calculation of visual conspicuousness based on the received image (step S201). The sound control device 20 generates map information by using a score based on the visual conspicuousness (step S202). The score is, for example, the degree of concentration in visual attention.

The sound output device 30 acquires position information (step S301). The sound output device 30 transmits the acquired position information to the sound control device 20 (step S302).

At this time, the sound control device 20 acquires the score corresponding to the position information transmitted by the sound output device 30 from the map information (step S203).

The sound control device 20 transmits control information of sound based on the acquired score to the sound output device 30 (step S204).

The sound output device 30 outputs a sound according to the control information received from the sound control device 20 (step S303).

Effect of First Embodiment

As explained so far, the acquiring unit 233 of the sound control device 20 acquires information indicating a risk corresponding to a position of the vehicle 30V from data in which the information indicating a risk during driving originated in scenery while traveling and a position are associated with each other. The output-sound control unit 234 performs a control of a sound to be output for the driver of the vehicle 30V according to the information acquired by the acquiring unit 233.

As described, the sound control device 20 can control a sound to be output for a driver according to a degree of risk. As a result, according to the first embodiment, it is possible to prevent a perceptual load on a driver from becoming excessive.

The generating unit 232 generates data in which information indicating a risk acquired by inputting an image captured by a moving object to a calculation model, which is generated based on an image capturing a view in a direction of a line of sight of a driver of the moving object and information relating to the line of sight of the driver at the time of capturing the image, and which is to calculate the information indicating a risk relating to driving from the image, and a position of the moving object at the time of capturing the image are associated with each other. The acquiring unit 233 acquires the information indicating a risk from the data generated by the generating unit 232. Thus, the control of sound according to the degree of risk based on the visual conspicuousness is enabled.

The output-sound control unit 234 controls an output of a sound content according to the degree of risk indicated by the information acquired by the acquiring unit 233, and the degree of relevance to driving of the sound content. Thus, important information, such as a message to call an attention relating to driving and a route navigation, can be informed to a driver for certain.

The output-sound control unit 234 disallows to output a sound content that has been predetermined to have a low degree of relevance to driving when the degree of risk indicated by the information acquired by the acquiring unit 233 is equal to or higher than a threshold. Thus, output of a sound content having low urgency can be limited, and information perceived by a driver can be reduced.

The output-sound control unit 234 decreases a reproduction volume of a sound content as a degree of risk indicated by the information acquired by the acquiring unit 233 increases. Thus, an amount of information perceived by a driver can be controlled precisely.

The output-sound control unit 234 reduces contents of a sound content to be output as a degree of risk indicated by the information acquired by the acquiring unit 233 increases. Thus, redundant information can be reduced, and only necessary information can be notified to a driver.

Figure 9:
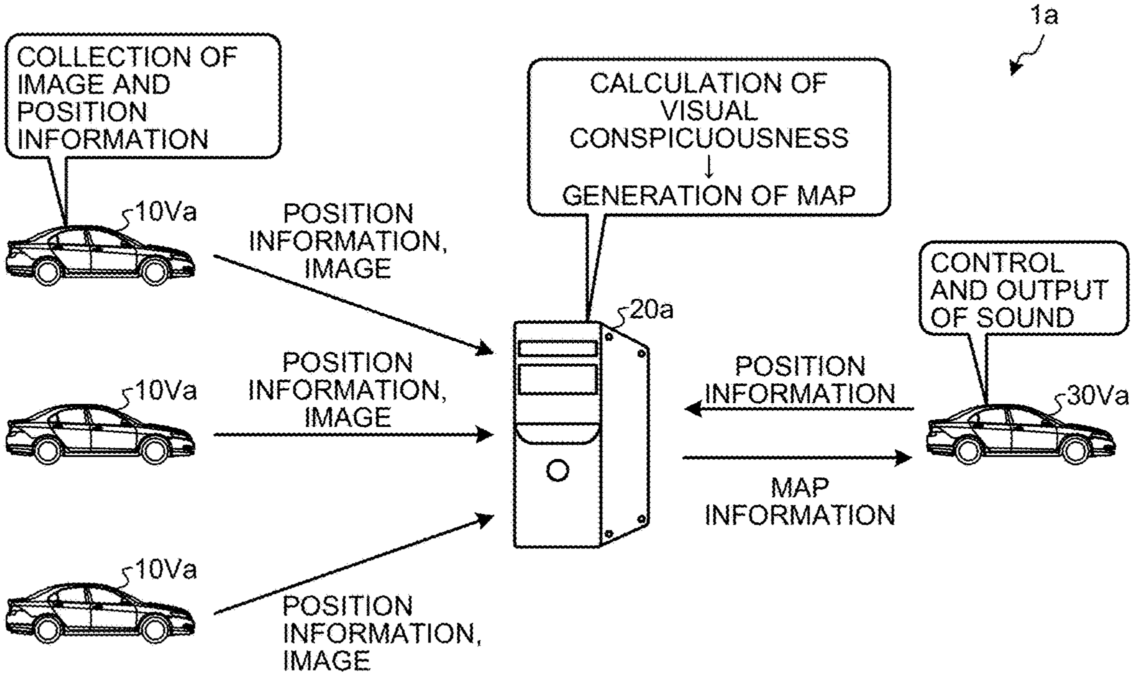
FIG. 9 is a diagram illustrating a configuration example of a sound control system according to a second embodiment.

The functions of the respective devices in the sound control system are not limited to ones in the first embodiment. FIG. 9 illustrates a configuration example of a sound control system according to a second embodiment. As illustrated in FIG. 9, a sound control system 1*a* includes a vehicle 10Va, a sound control device 20*a*, and a vehicle 30Va.

As illustrated in FIG. 9, in the second embodiment, a sound control device 20*a* transmits map information to a vehicle 30Va, not control information. The vehicle 30Va acquires information of a risk from the map information, and controls output of a sound. In the second embodiment, a processing load on the sound control device 20*a* can be reduced.

Figure 10:
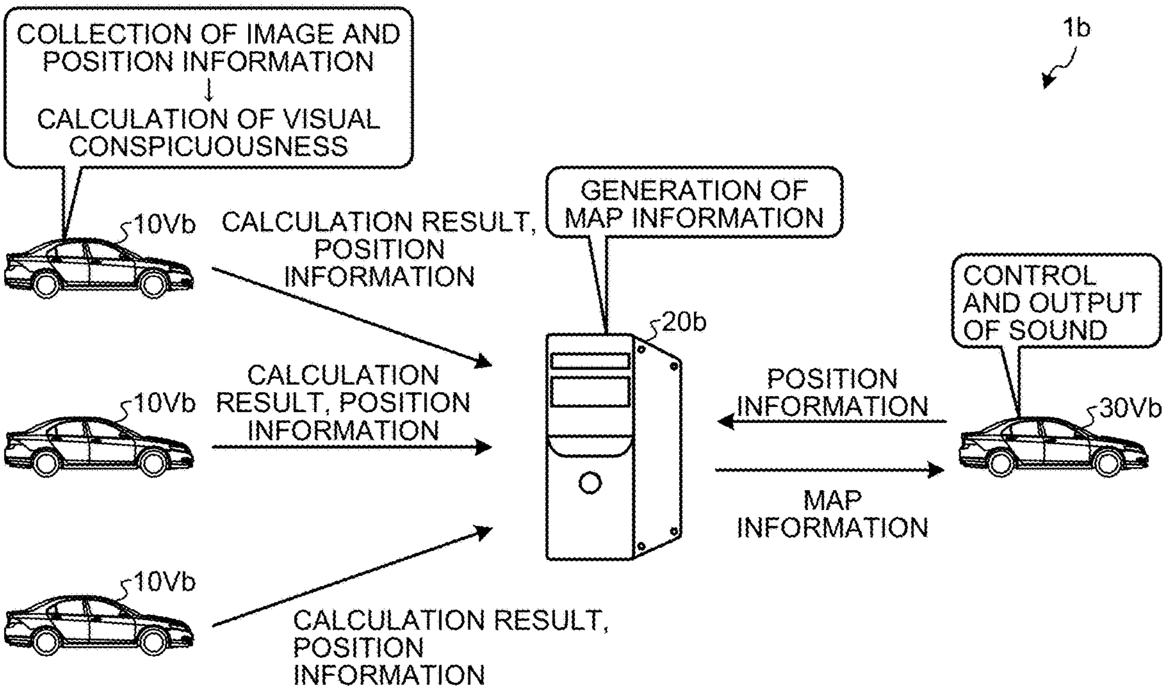
FIG. 10 is a diagram illustrating a configuration example of a sound control system according to a third embodiment.

FIG. 10 is a diagram illustrating a configuration example of a sound control system according to a third embodiment. As illustrated in FIG. 10, in the third embodiment, a vehicle 10Vb performs calculation of visual conspicuousness. As illustrated in FIG. 10, a sound control system 1*b* includes a vehicle 10Vb, a sound control device 20*b*, and a vehicle 30Vb.

A sound control device 20*b* receives a calculation result and position information, to generate map information. In the third embodiment, because communication of an image between the vehicle 10Vb and the sound control device 20*b*, a communication amount can be reduced.

Fourth Embodiment

Figure 11:
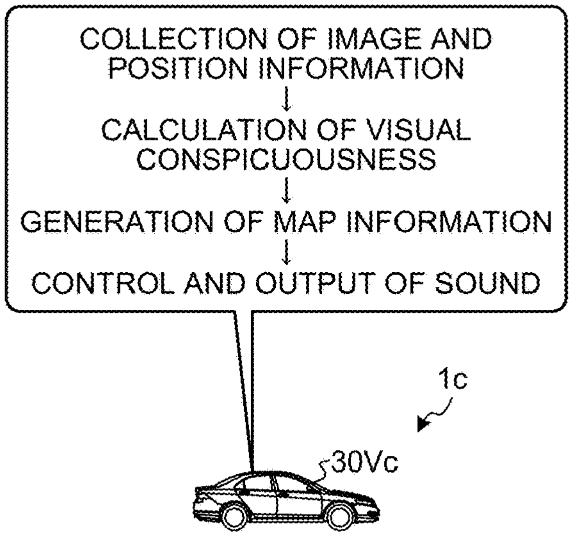
FIG. 11 is a diagram illustrating a configuration example of a sound control system according to a fourth embodiment.

FIG. 11 is a diagram illustrating a configuration example of a sound control system according to a fourth embodiment. As illustrated in FIG. 11, a sound control system 1*c* includes a vehicle 10Vc. In fourth embodiment, it is configured to complete all functions with a single vehicle.

As illustrated in FIG. 11, a vehicle 30Vc collects an image and position information, and performs calculation of visual conspicuousness based on the collected image. The vehicle 30Vc generates map information, and performs control and output of a sound based on a degree of risk acquired from the generated map.

In the fourth embodiment, because control is performed based on images sequentially collected, control responding to an actual environment in which the vehicle 30Vc is traveling is possible.

Fifth Embodiment

Figure 12:
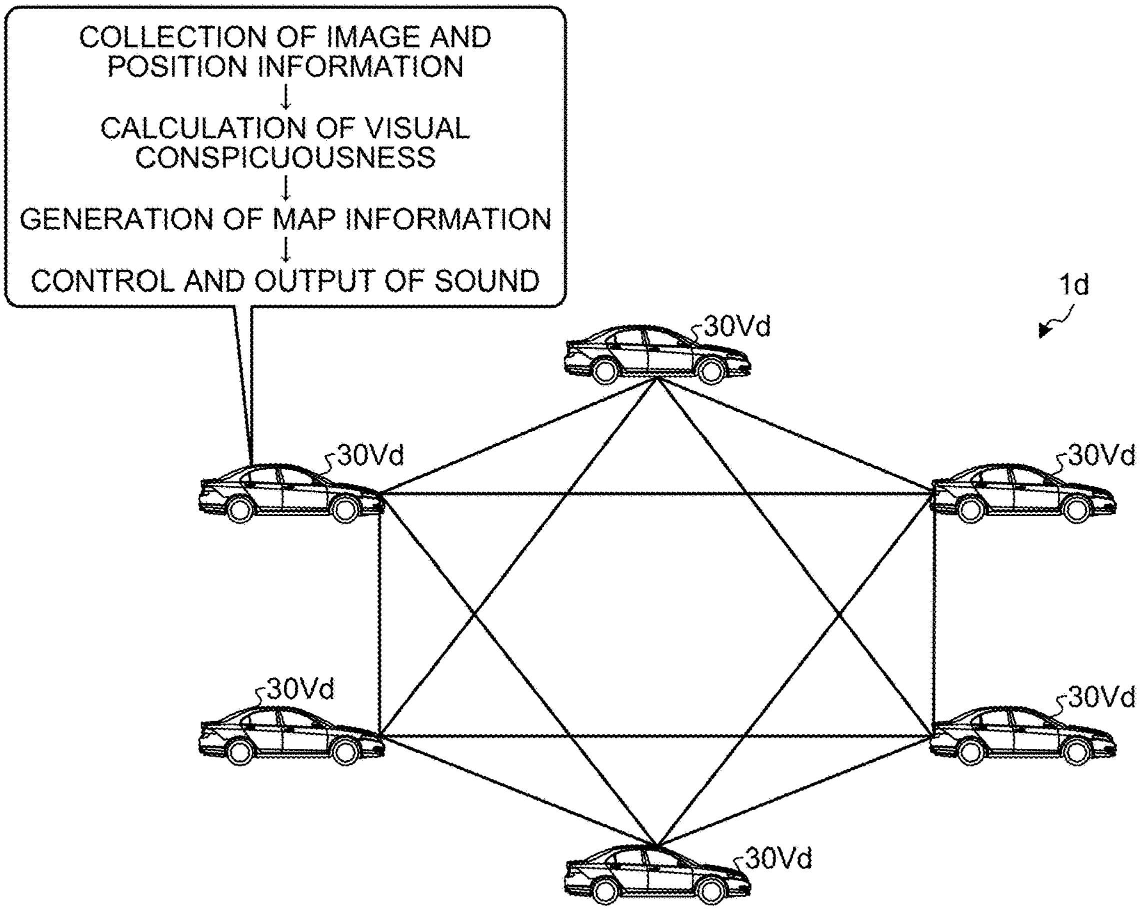
FIG. 12 is a diagram illustrating a configuration example of a sound control system according to a fifth embodiment.

FIG. 12 is a diagram illustrating a configuration example of a sound control system according to a fifth embodiment. As illustrated in FIG. 12, a sound control system 1*d* includes a vehicle 30Vd. The sound control system may have a configuration without a server as illustrated in FIG. 12. In this case, plural vehicles 30Vd construct a blockchain.

In the fifth embodiment, while sharing map information among the vehicles 30Vd, the credibility of information can be ensured by the blockchain. Furthermore, according to the fifth embodiment, it is possible to avoid influence of a server down and the like.

REFERENCE SIGNS LIST

1 SOUND CONTROL SYSTEM
10 INFORMATION PROVIDING DEVICE
10V, 30V VEHICLE
11, 21, 31 COMMUNICATION UNIT
12 IMAGING UNIT
13 POSITIONING UNIT
14, 22 STORAGE UNIT
15, 23, 35 CONTROL UNIT
20 SOUND CONTROL DEVICE
30 SOUND OUTPUT DEVICE
221 MODEL INFORMATION
222 MAP INFORMATION
231 CALCULATING UNIT
232 GENERATING UNIT
233 ACQUIRING UNIT
234 OUTPUT-SOUND CONTROL UNIT

The invention claimed is:

1. A sound control device comprising a controller configured to:

generate data in which information indicating a perceptual load and a position of a moving object at a time of capturing an image by the moving object are associated with each other, wherein (i) the information indicating the perceptual load is acquired by inputting the image captured by the moving object to a calculation model, and (ii) the calculation model is (a) generated based on a learning image and information relating to a line of sight of a subject relating to the learning image, and (b) configured to calculate the information indicating the perceptual load from the image captured by the moving object;

acquire, using the position of the moving object, the information indicating the perceptual load corresponding to the position of the moving object from the data in which the information indicating the perceptual load during driving and the position of the moving object are associated with each other; and cause sound to be output for a driver of the moving object according to the acquired information, wherein the perceptual load is obtained as a degree of concentration in visual attention that is calculated based on (i) an index acquired by estimating a position of a first line of sight of the driver in an image captured by the moving object, and (ii) a second line of sight of the driver directed along a traveling direction in a traffic environment in the image.

2. The sound control device according to claim 1, wherein the controller is further configured to cause the sound to be output according to the perceptual load and relevance of a sound content to driving.

3. The sound control device according to claim 2, wherein the controller is further configured to prohibit the sound content having a low degree of relevance to driving from being output based on the degree of perceptual load being equal to or higher than a threshold.

4. The sound control device according to claim 2, wherein the controller is further configured to reduce a reproduction volume of the sound content as the degree of perceptual load increases.

5. The sound control device according to claim 2, wherein the controller is further configured to reduce types or amounts of the sound content to be output as the degree of perceptual load increases.

6. A sound control system comprising:

a first moving object;

a second moving object; and a sound control device, wherein the first moving object is configured to transmit, to the sound control device, a first image capturing a view in a direction of a line of sight of a driver of the first moving object, and a position of the first moving object at a time of imaging the first image, the sound control device includes a controller configured to:

generate data in which information indicating a perceptual load and a position of a moving object at a time of capturing an image by the moving object are associated with each other, wherein (i) the information indicating the perceptual load is acquired by inputting the first image captured by the moving object to a calculation model, and (ii) the calculation model is (a) generated based on a learning image and information relating to a line of sight of a subject relating to the learning image, and (b) configured to calculate the information indicating the perceptual load from the image captured by the moving object;

acquire, using the position of the moving object, the information indicating the perceptual load corresponding to a position of the second moving object from the generated data in which the information indicating the perceptual load during driving and the position of the moving object are associated with each other; and perform control of sound to be output for a driver of the second moving object according to the acquired information, and the second moving object is configured to:

transmit the position of the second moving object to the sound control device; and output the sound according to the control of sound, wherein the perceptual load is obtained as a degree of concentration in visual attention that is calculated based on (i) an index acquired by estimating a position of a first line of sight of the driver in an image captured by the moving object and (ii) a second line of sight of the driver directed along a traveling direction in a traffic environment in the image.

7. A sound control method performed by a computer, the method comprising:

a generating step of generating data in which information indicating a perceptual load and a position of a moving object at a time of capturing an image by the moving object are associated with each other, wherein (i) the information indicating the perceptual load is acquired by inputting the image captured by the moving object to a calculation model, and (ii) the calculation model is (a) generated based on a learning image and information relating to a line of sight of a subject relating to the learning image, and (b) configured to calculate the information indicating the perceptual load from the image captured by the moving object;

an acquiring step of acquiring, using the position of the moving object, the information indicating perceptual load corresponding to the position of the moving object from the data in which the information indicating perceptual load during driving and the position of the moving object are associated with each other; and a sound control step of causing sound to be output for a driver of the moving object according to the acquired information, wherein the perceptual load is obtained as a degree of concentration in visual attention that is calculated based on (i) an index acquired by estimating a position of a first line of sight of the driver in an image captured by the moving object and (ii) a second line of sight of the driver directed along a traveling direction in a traffic environment in the image.

* * * * *